(12) United States Patent
Kunz et al.

(10) Patent No.: US 8,606,674 B1
(45) Date of Patent: *Dec. 10, 2013

(54) INCOME ANALYSIS TOOLS FOR WEALTH MANAGEMENT

(71) Applicant: The PNC Financial Services Group, Inc., Pittsburgh, PA (US)

(72) Inventors: Thomas S. Kunz, Pittsburgh, PA (US); Erik Rettger, Delmont, PA (US); David Farkas, Philadelphia, PA (US); Christina Payne Earle, Pittsburgh, PA (US); Dennis Y. Wang, Pittsburgh, PA (US); Rodney H. Monson, Waukegan, IL (US); Luke P. Woods, Chicago, IL (US); Simon King, Chicago, IL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,926

(22) Filed: Nov. 26, 2012

Related U.S. Application Data

(63) Continuation of application No. 13/037,063, filed on Feb. 28, 2011, now Pat. No. 8,321,316.

(51) Int. Cl.
*G06Q 40/00* (2012.01)

(52) U.S. Cl.
USPC .......................................................... 705/35

(58) Field of Classification Search
USPC ............................................... 705/35, 30, 37
See application file for complete search history.

(56) References Cited

U.S. PATENT DOCUMENTS

| | | | |
|---|---|---|---|
| 7,668,768 B2 * | 2/2010 | Oikonomidis | 705/35 |
| 7,818,233 B1 * | 10/2010 | Sloan et al. | 705/36 R |
| 8,015,090 B1 * | 9/2011 | Borzych et al. | 705/35 |
| 2002/0077955 A1 * | 6/2002 | Ramm | 705/37 |
| 2002/0147671 A1 * | 10/2002 | Sloan et al. | 705/36 |
| 2002/0188536 A1 * | 12/2002 | Milosavljevic et al. | 705/35 |
| 2006/0282353 A1 * | 12/2006 | Gikandi | 705/30 |
| 2007/0055589 A1 * | 3/2007 | Jameson | 705/29 |
| 2007/0239572 A1 * | 10/2007 | Harris et al. | 705/35 |
| 2009/0024540 A1 * | 1/2009 | Ryder | 705/36 R |
| 2009/0254469 A1 * | 10/2009 | Robertson | 705/35 |
| 2010/0131306 A1 * | 5/2010 | Koo et al. | 705/4 |
| 2011/0282803 A1 * | 11/2011 | Woods et al. | 705/36 R |

FOREIGN PATENT DOCUMENTS

WO  WO 2008/103734  *  8/2008  ............ G06Q 40/00

OTHER PUBLICATIONS

CharlesSchwab: PortfolioCenter Reports, Feb. 12, 2009, Schwab Performance Technologies, pp. 1-48.*
Investment Systems Company: Portfolio Accounting System, 2000, www.investmentsystem.com, pp. 1-34.*

* cited by examiner

*Primary Examiner* — Bijendra K Shrestha
(74) *Attorney, Agent, or Firm* — Buchanan Ingersoll & Rooney PC; Robert J. Pugh

(57) ABSTRACT

Enhanced processes, methods, tools, strategies, and techniques are provided for more effectively and efficiently processing, managing, analyzing, and communicating wealth related data and other financial information within a computing environment. In various embodiments, the analysis tools provided herein have been designed to correspond visually with a mental model employed by many clients in managing their wealth.

17 Claims, 10 Drawing Sheets

FIG. 9

Online Banking

| My Accounts | Transfer Funds | Pay Bills | Business | Customer Service | My Offers |

Summary | Account Activity | Wealth Management

Wealth Insight — 904

| Brief | Allocation | Income | Appreciation | Transactions | Team | Net Worth |

Net Worth 930
- Assets $13,697,056
- Liabilities $355,965
- $13,341,091

Highlight ● PNC Accounts | 🖨 Print Page | ● Add Account | ☑ Check All | ● Manage Accounts | ⊕ Create a Group Assets $13,697,056 — 906

Cash $498,591 Edit
- ☑ Joint Checking 912 $122,497
- ☑ Savings 914 $303,259
- ☑ Money Market 916 $72,835

Trust Accounts $4,676,467 Edit — 908
- ☑ Family Trust 918 $1,238,322
- ☑ Smith IRR Trust 920 $3,438,145

Retirement $2,209,331 Edit

☑ Fox Chapel House 922 $655,234
☑ Aspen Condo 924 $497,564
☑ Barb's 401K 926 $923,347

College 910 $570,298 Edit
☑ Jane's 529 928 $142,239

902

INCOME ANALYSIS TOOLS FOR WEALTH MANAGEMENT

FIELD OF THE INVENTION

The invention embodiments described herein generally relate to processing financial information within a computer system architecture. In various embodiments, the invention more particularly relates to various computer-implemented tools for managing and processing financial information including wealth management data.

BACKGROUND

How to effectively and efficiently manage financial resources is an important consideration for anyone who is responsible for cash, assets, or other material possessions that constitute wealth.

However, many wealth management tools do not provide adequate assistance to wealth management clients, such as the customers of a financial or banking institution, for example. Many currently available tools do not address the uncertainty that wealth management clients may feel with regard to what comprises their wealth and what direction the growth of that wealth is taking. Tools are needed that can increase both the perception and the reality of proper control of assets by the wealth management client. Also, tools that can foster a better relationship between clients and their advisors are critical for proper wealth management.

In view of the foregoing issues, enhanced tools, techniques and strategies are needed for processing, managing, displaying, and communicating wealth management information.

BRIEF DESCRIPTION OF THE FIGURES

The utility of the embodiments of the invention will be readily appreciated and understood from consideration of the following description of the embodiments of the invention when viewed in connection with the accompanying drawings, wherein.

DESCRIPTION

Various embodiments of the invention provide enhanced processes, methods, tools, strategies, and techniques for more effectively and efficiently processing, managing, analyzing, and communicating wealth related data and other financial information within a computing environment.

In developing embodiments of the invention, the inventors have addressed the problem of how to present wealth management information to clients in the most effective way possible. The inventors have recognized that many clients perform financial-related tasks such as paying bills, reviewing investments, opening mail, and other such activities in a central place in their homes or offices. Various embodiments of the invention provide a mental model or mental "buckets" of how the client might typically view financial information by allowing the client to view the information in a way that corresponds with the home or office experience. In various embodiments, the client is permitted to view multiple financial accounts as a consolidated display, while having the capability to investigate the details of individual accounts as desired.

As described in more detail below, embodiments of the invention (sometimes referred to herein as "Wealth Insight" analytical tools), offer an innovative design interface that caters to the way that many wealth management clients want to view their assets. These tools can be configured to provide appropriate, distilled contextual information, transparency to the financial situation of the client, and a collaborative interface to support the client (e.g., through an advisory team relationship). These tools can reduce uncertainty for the wealth management client, increase a sense of control, increase a depth of satisfaction with asset management, and foster healthy client-advisor relationships.

Figure 1:
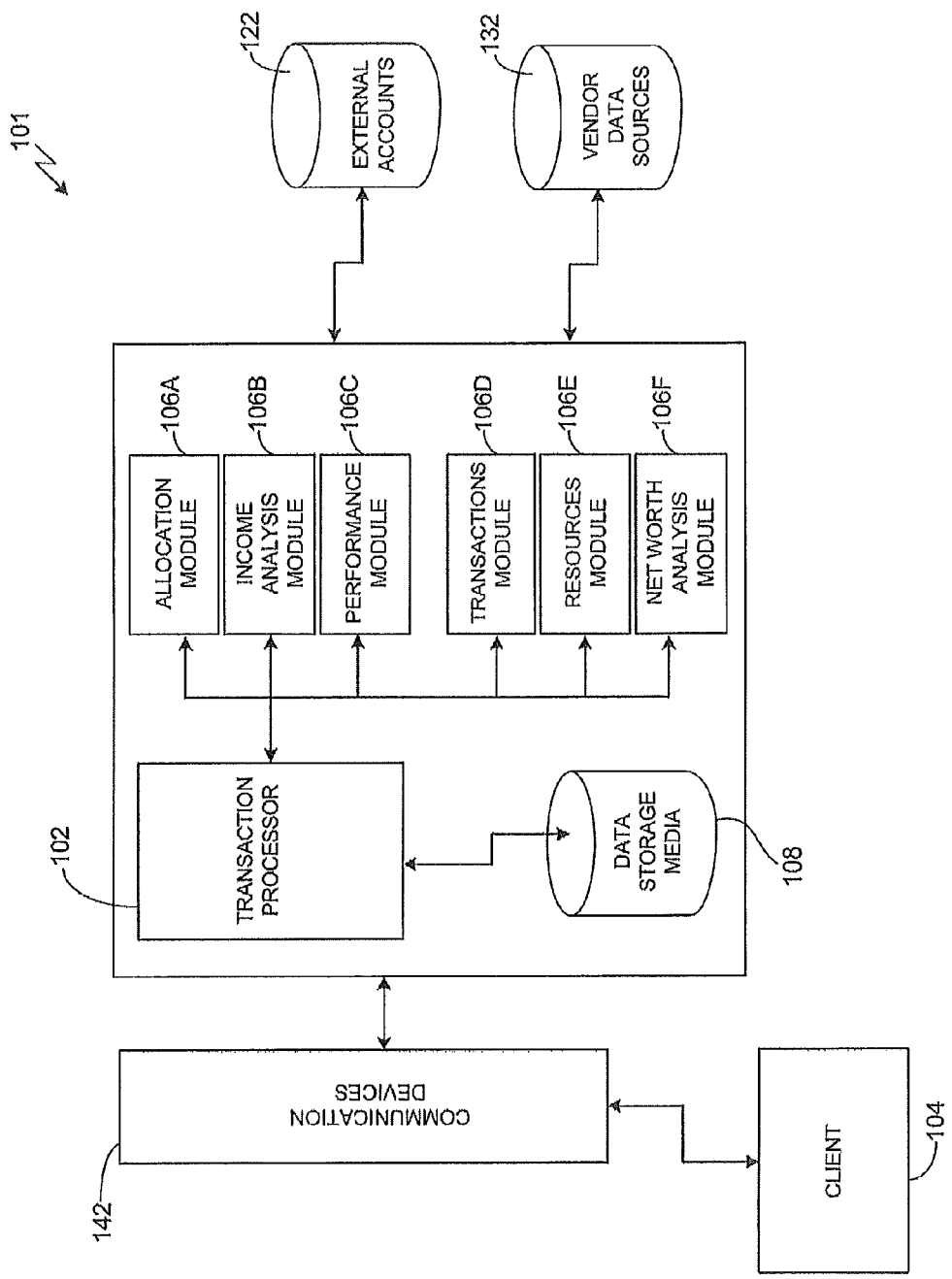
FIG. 1 schematically illustrates an example of a wealth management system that may be structured in accordance with various embodiments of the invention.
Figure 2:
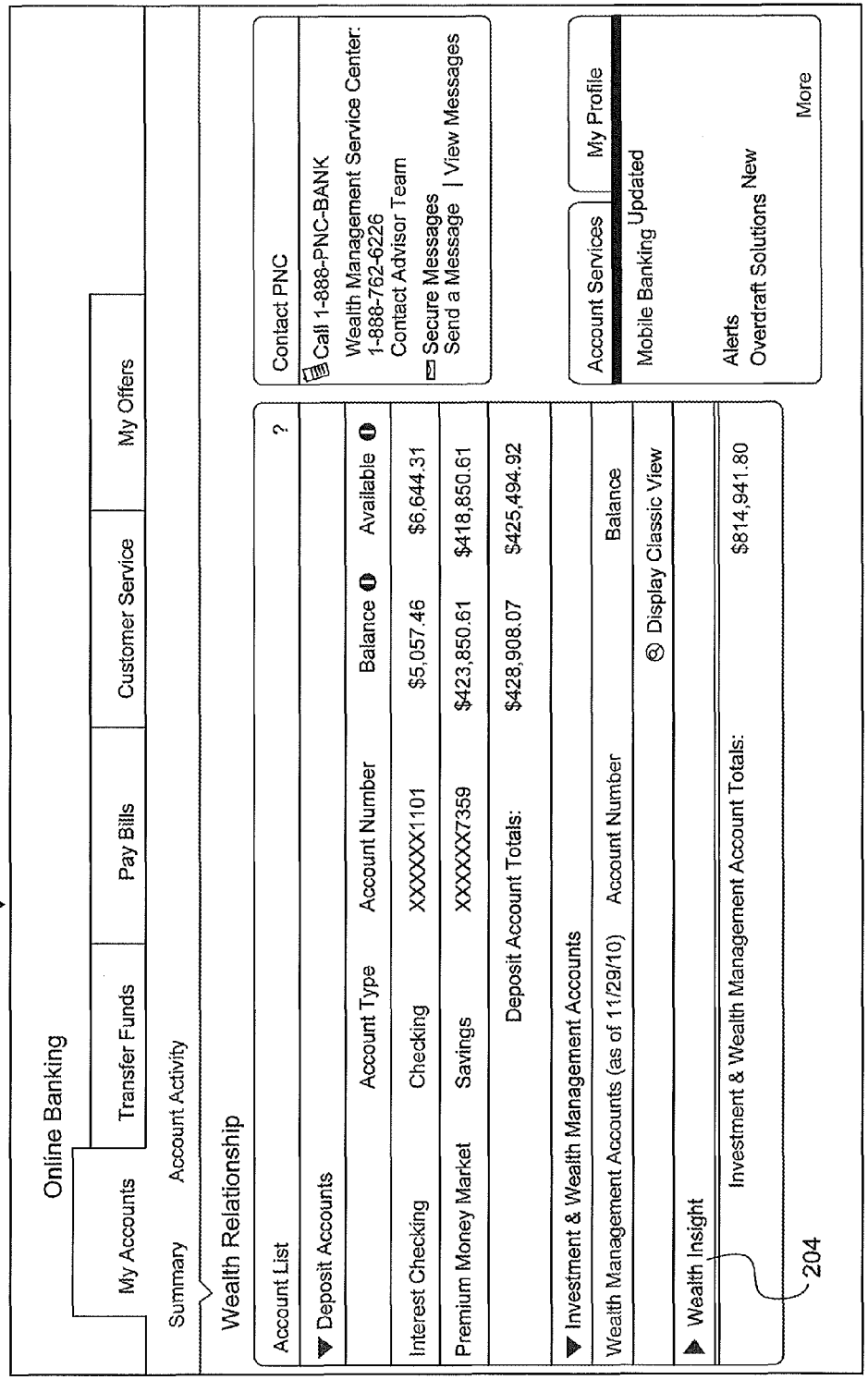
FIG. 2 includes an example of a screen display that may be configured in accordance with embodiments of the invention.
Figure 3A:
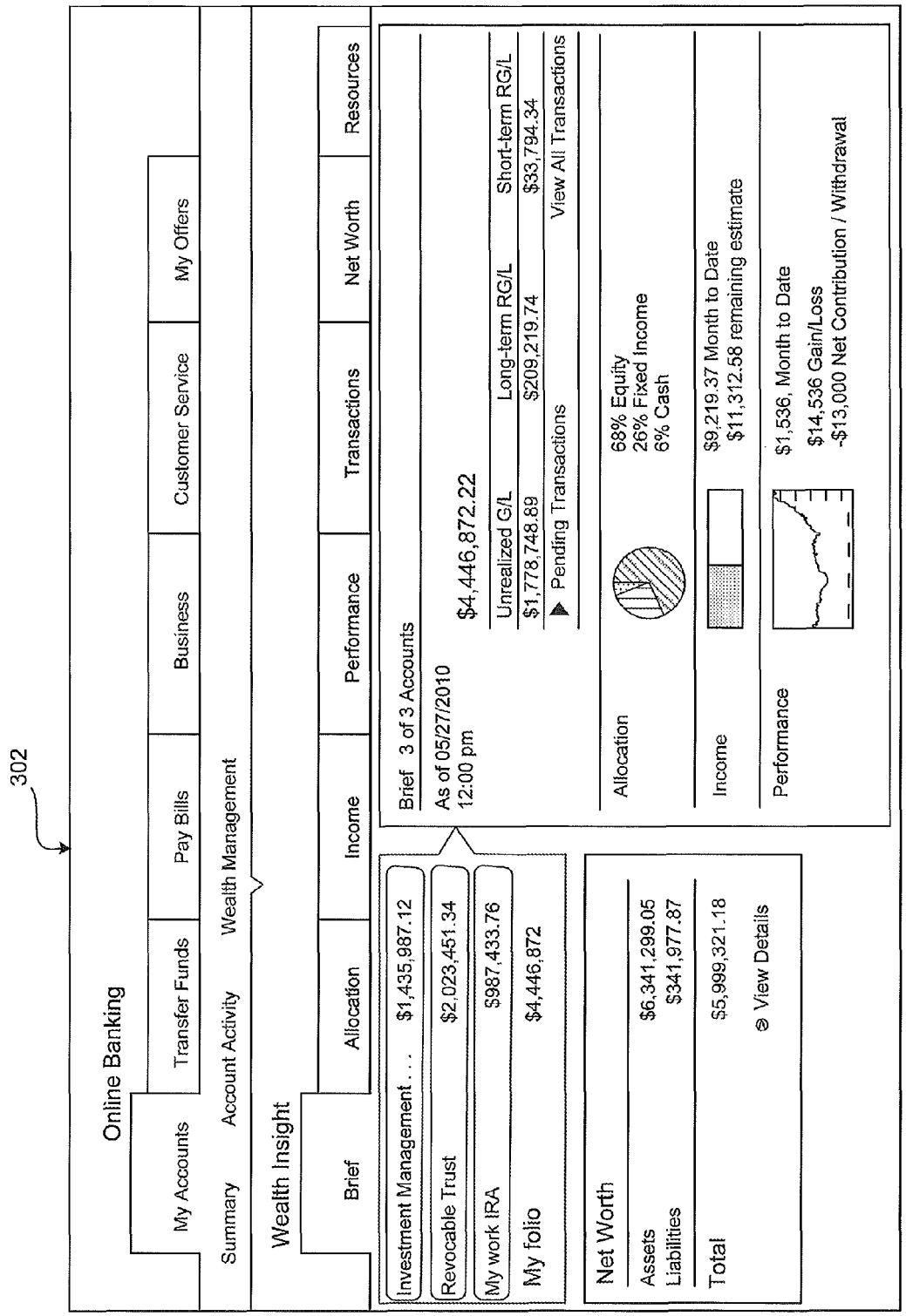
FIG. 3A includes an example of a screen display and associated analytical tools that may be configured in accordance with embodiments of the invention.
Figure 3B:
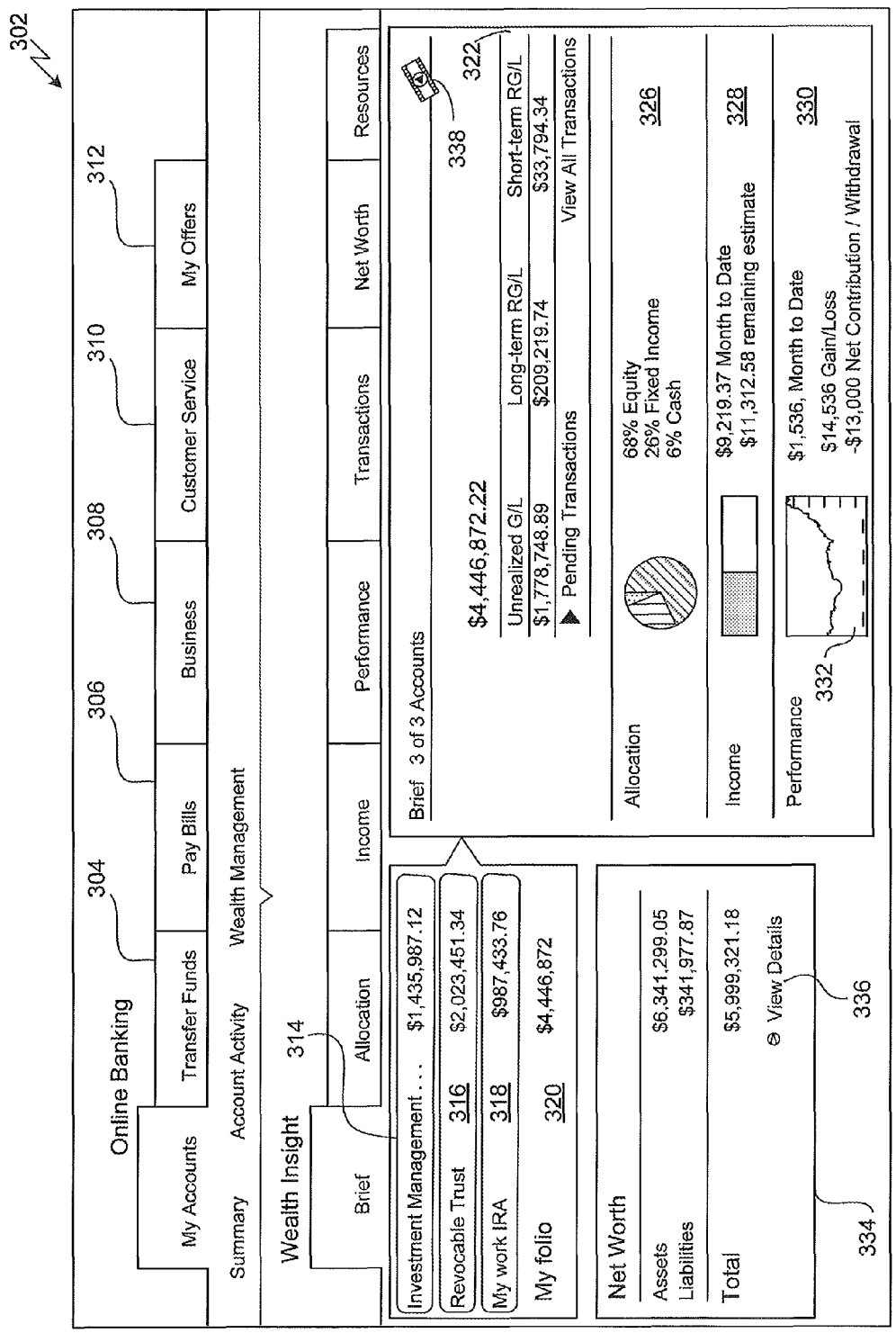
FIG. 3B includes an enhanced view of the screen display and associated analytical tools illustrated in FIG. 3A.

FIG. 1 illustrates various aspects of an example of a wealth management system 101 configured in accordance with certain embodiments of the invention. The management system 101 may include one or more transaction processors 102 which may be programmed to process wealth management data, for example, and other information related to the accounts, assets, investments, and other financial data of various wealth management clients 104. In certain embodiments, the transaction processor 102 may include a web server, for example, or another computer system capable of processing data and serving screen displays and other user interface tools to the clients 104.

The transaction processor 102 may be operatively associated with one or more modules 106A-106F that perform various functions within the management system 101. For example, an allocation module 106A may be configured to process and display data and user interface tools related to an asset allocation or asset mix in the portfolio of a client 104. In another example, an income analysis module 106B may be provided for summarizing and displaying transactions that impact income available for use by the clients 104. A performance module 106C may be provided for comparing performance of client 104 accounts and assets against a benchmark such as a stock market index, for example. A transactions module 106D may be programmed to allow clients 104 to readily manipulate and graphically represent transactions involving their investments or assets, for example, over a variety of different time periods. In another example, a resources module 106E may be programmed to provide clients 104 with numerous types of information (e.g., stock market news) and to manage interactions between clients 104 and a team of advisors. Also, a Net Worth analysis module 106F may be provided for assisting clients 104 with determining personal Net Worth calculations, for example, based on a combination of assets (e.g., checking accounts, saving accounts, money market accounts, houses, etc.) and liabilities which may represent future expenditures of financial resources (e.g., college expenses, weddings, travel plans, etc.).

In various embodiments, the management system 101 may include one or more data storage media 108 operatively associated with the transaction processor 102. The data storage media 108 may include data and other information associated with one or more client 104 accounts, for example, including data related to assets, liabilities, investments, and other financial information. The management system 101 may also communicate with one or more external accounts 122 to receive or transmit data. The external accounts 122 may be financial accounts associated with the clients 104, for example. The management system 101 may also be configured for communication with one or more research vendor data sources 132. The vendor data sources 132 may provide information such as market news, for example, or other financial data and updates. In various embodiments, clients 104 may communicate or interact with the management system 101 through a variety of communication devices 142. Examples of possible communication devices 142 include personal computers (e.g., laptops, notebooks, desktops, etc.), mobile phones, smart phones, personal data devices, and many other devices which can connect to the management system 101 through a wireless or wireline connection (e.g., Internet, intranet, or another type of connection).

With reference to FIGS. 1 through 3B, an example of a portal screen 202 that may be displayed to a client 104 of a financial institution is shown. In this example, the financial institution is a banking institution and the portal screen 202 provides access to various online banking tools that the bank might offer to the client 104. The portal screen 202 may display financial information to the client 104, such as data related to checking accounts and saving accounts, for example. In addition, the portal screen 202 may include a link 204 to a section that provides various "Wealth Insight" tools to the client 104. When the client 104 accesses the link 204, the transaction processor 102 may be directed to present a summary screen 302 (see FIGS. 3A and 3B) on a display of a communication device 142 associated with the client 104.

The summary screen 302 may be integrated with the current online banking architecture of the financial institution. For example, the client 104 may navigate from the summary screen 302 to other aspects of the online banking experience (e.g., transfer funds 304, pay bills 306, business 308, customer service 310, My Offers 312, or others). In various embodiments, the summary screen 302 can be configured to provide a "brief" overview of the assets of the client 104. In certain embodiments, the client 104 may select which accounts, assets, or other items are included in the calculations and other information processing performed by the "Wealth. Insight" tools. For example, the client 104 may select asset objects 314, 316, 318 that represent accounts to include in a "My PNC Folio" section 320 of the screen display 302. For example, selection and grouping of the asset objects 314, 316, 318 may be performed by clicking, dragging, and/ or dropping the asset objects 314, 316, 318 on or within the vicinity of the "My PNC Folio" section 320. In this manner, calculations performed by the tools described herein can be adjusted and revised based on the type of asset objects that comprise the "My PNC Folio" section 320. It can be seen that this click-drag-drop function can facilitate grouping of accounts in a mental model for viewing or manipulation by the client 104. In addition, the "My PNC Folio" section 320 can be configured to provide a quick view of the pertinent information for the accounts selected for the client 104, including the value of those accounts. Selection and manipulation of asset objects, liability objects, and other types of objects may be accomplished with a suitable user manipulation device, such as a mouse, a stylus, a finger of a user, or by using a variety of other suitable manipulation devices.

In various embodiments, an overview section 322 provides a summary of the value of accounts selected. Also, information including realized and unrealized gains for both long-term gains and losses and short-term gains and losses may be presented for the accounts. A pending transactions link 324 can be accessed to generate a list of pending transactions such as transactions reflecting investment decisions made by the client 104, for example.

An "Allocation" section 326 may be configured to provide a summary of the allocation of assets across the accounts selected in the "My PNC Folio" section 320. This section 326 can provide a summary of asset allocation for the client 104 accounts, including how they are positioned, what holdings they represent, and their concentrations. For example, if the client 104 is of retirement age and is drawing significant cash from the accounts for living expenses, then the client 104 might desire to maintain a greater percentage of assets in the fixed income category because of volatility concerns associated with other forms of investment (e.g., equity investments). It can be seen that the "Allocation" section 326 provides a convenient alternative for the client 104 to viewing accounts separately, including accounts held within the financial institution and accounts external to the institution.

In various embodiments, an "Income" section 328 provides an indication of the income produced by the accounts selected in the "My PNC Folio" section 320. This section 328 provides an indication of what funds the client 104 may have drawn for a given time period (e.g., month-to-date, year-to-date, or other), as well as an estimate of funds remaining for income for the relevant time period. For example, if the client 104 is in a retirement phase and is drawing significant funds for living expenses from the accounts, then the client 104 may want to know how much income is available for budgeting expenses such as utility bills, mortgage payments, taxes, and other living expenses.

A "Performance" section 330 may be configured to provide a summary for a given time period (e.g., month-to-date, year-to-date, or another period) of how the selected accounts have performed financially over the time period. It can be appreciated that presenting a year-to-date value for performance, for example, may reinforce a long-term mentality for the client versus a shorter time period such as month-to-date. Within the "Performance" section 330, a chart or other graphical representation 332 can be provided to illustrate performance of the selected accounts. This section 330 may also be configured to highlight more specifically net contributions or withdrawals, including income being generated from the performance of the holdings, and potentially gains or losses associated with the accounts. In addition, in certain embodiments a percentage rate of return for performance may be calculated and displayed based on the selected accounts. In various embodiments, a benchmark (e.g., S&P Index) may be selected and presented for comparison purposes. Even though the selected benchmark may not be entirely applicable to the holdings or allocations of the selected accounts, the benchmark may nonetheless serve as an indicator that the overall economy is doing well, for example, and that the client 104 accounts are performing better or worse than that benchmark.

In various embodiments, a "Net Worth" section 334 may be provided to summarize and display a Net Worth calculation for the client 104. A "View Details" link 336 can be provided to access more details of how the Net Worth calculation has been performed (see discussion below). It can be seen that making adjustments to the composition of the "My PNC Folio" section 320, such as by removing or adding accounts, can be configured to adjust the summary sections presented on the screen display 302, as well as the operation and calculation of other analytical tools described herein.

In certain embodiments, one or more in-context help videos can be viewed by selecting the help link 338. The in-context help videos may be configured as video demonstrations of how to access and manipulate various portions of the screen display on which the link 338 is provided. For example, selecting the help link 338 on the current screen display 302 may provide, among other content, a video that demonstrates how to select the "View Details" link 336 to access details on the basis for the Net Worth calculation in the "Net Worth" section 334. It can be appreciated that the content made available through the help link 338 can be a function of the particular screen display on which the help link 388 is presented.

Figure 4:
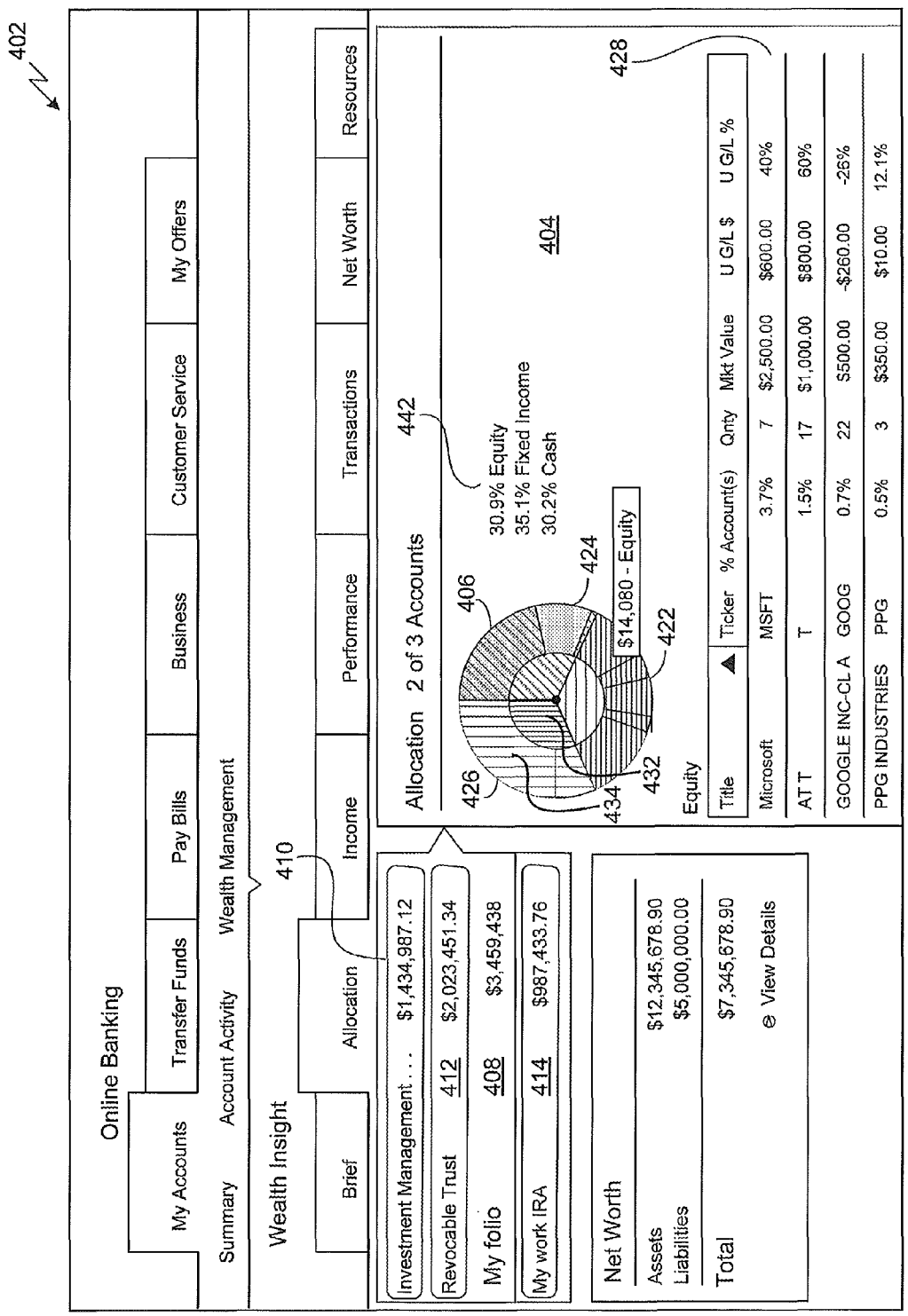
FIG. 4 includes an example of a screen display and associated analytical tools that may be configured in accordance with embodiments of the invention.

FIG. 4 includes a screen display 402 that illustrates aspects of an example of an allocation analysis tool 404. In various embodiments, the allocation analysis tool 404 graphically presents by type of asset (e.g., equity, fixed income, cash, or alternative) the current allocation of assets or asset mix for the client 104. In accordance with the discussion above, a graphical display portion 406 of the tool 404 may be generated in response to one or more client 104 accounts selected in a "My PNC Folio" section 408 of the screen display 402. In this example, account or asset objects for investment management 410 and revocable trust 412 have been selected for inclusion in the "My PNC Folio" section 408, while an IRA-related asset object 414 remains unselected.

In various embodiments, the graphical display portion 406 of the analysis tool 404 may be presented as a pie chart with multiple segments, such as an equity segment 422, a fixed income segment 424, and a cash segment 426. In one aspect, by hovering over or selecting the segments 422, 424, 426 with a user manipulation device (e.g., a mouse), information regarding that particular segment 422, 424, 426 can be displayed. In the example shown, the manipulation device is hovering over the equity segment 422 to display a value of $14,080 for the equity segment 422. In certain embodiments, selecting a segment 422, 424, 426 can also be configured to display a list 428 of the assets or accounts which comprise the selected segment 422, 424, 426. Selecting different segments 422, 424, 426 can be performed to filter the holdings in the selected client 104 accounts and generate a revised list 428.

In certain embodiments, in the example of the allocation analysis tool 404 shown in FIG. 4, the graphical display portion 406 may be configured with one or more sets of nested concentric rings. For example, selecting an inner ring 432 of the graphical display portion 406 may be configured to provide a total value of the selected asset type (e.g., the value of all cash holdings in the cash segment 426). In various embodiments, one or more sub-segments 434 may be included within each concentric ring portion of the display portion 406. Selecting the sub-segment 434 may be configured to display an account or holding that forms a component part of the selected asset type. For example, the sub-segment 434 may represent cash holdings within a money market account of the client 104. As shown in this example in the equity segment 422, one sub-segment may be designated to represent small market cap holdings and another sub-segment may be designated to represent large market cap holdings. Examples of sub-segments for the fixed income segment 424 include treasuries, corporate bonds, and municipal bonds, among others. Selecting a sub-segment may also be configured to correspondingly update the list 428 on the screen display 402. In this example, various large market cap assets are displayed, such as when the large market cap sub-segment of the equity segment 422 has been selected.

In various embodiments, a summary breakdown 442 of the entire asset allocation for the selected client 104 accounts can be presented on the screen display 402. In certain embodiments, the graphical display portion 406 of the allocation analysis tool 404 can be configured to change appearance (e.g., shading, coloring, highlighting, or other like appearance) in the event that a desired asset allocation is below or above a desired level of asset type allocation. For example, if a 40% allocation of cash is desired but recent changes in investments have now resulted in a 30.2% allocation of cash (as shown), then the appearance of the cash segment 426 can be altered by the system 101 to reflect that the desired allocation does not exist within the client 104 accounts or holdings. This feature can serve as a warning signal to the client 104 or a financial advisor to consider adjusting the mix of assets to achieve the desired allocation levels.

Figure 5:
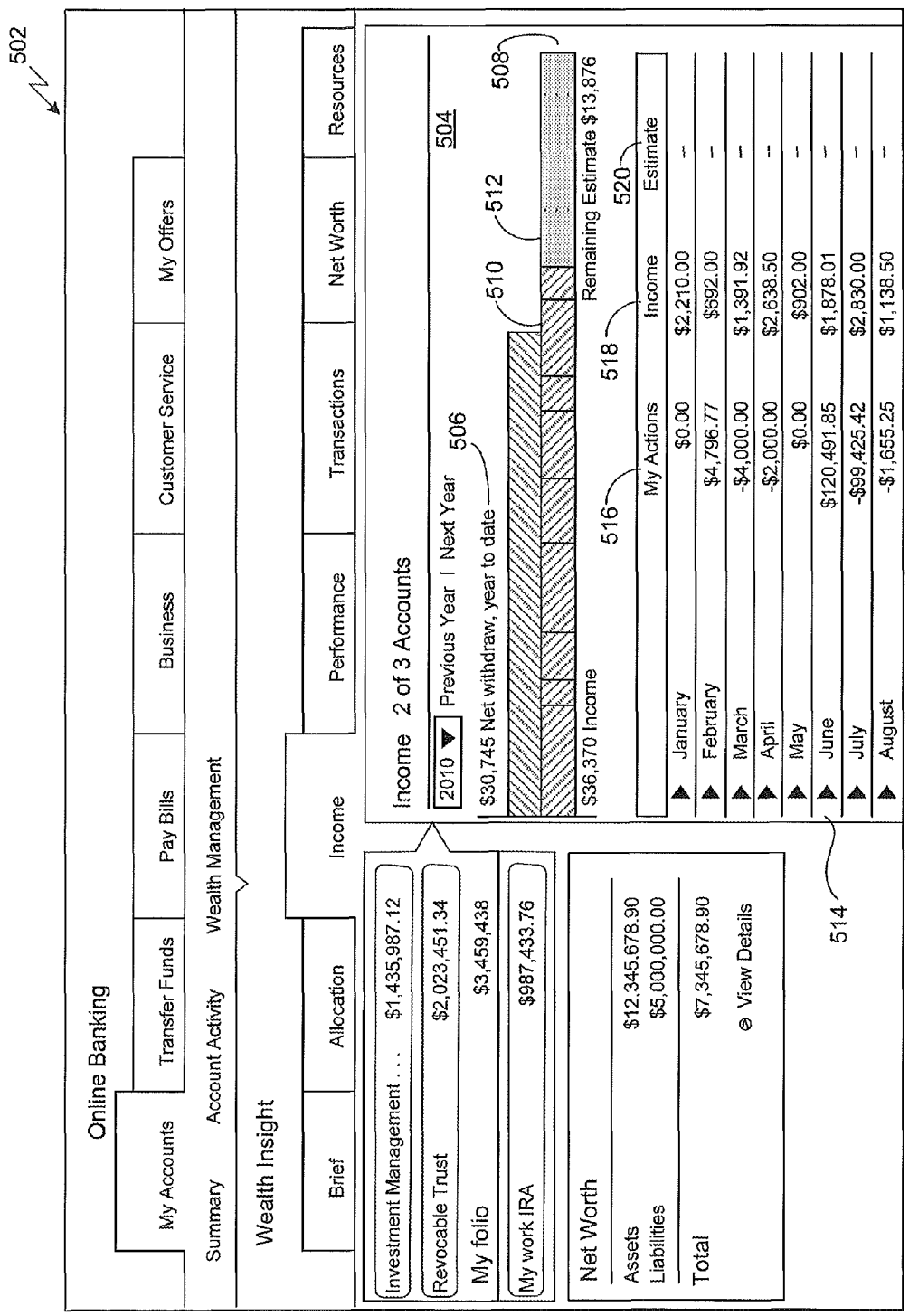
FIG. 5 includes an example of a screen display and associated analytical tools that may be configured in accordance with embodiments of the invention.

FIG. 5 includes a screen display 502 that illustrates aspects of an example of an income analysis tool 504. The income analysis tool 504 permits a user to visualized income inflows and outflows associated with selected client 104 accounts over various time periods (e.g., monthly, yearly, or other). Income inflows can represent deposits into accounts or changes in investments (e.g., interest and dividends), for example. Income outflows can represent account withdrawals initiated by the client 104, for example. In certain embodiments, the tool 504 may also be configured to display estimated income expected for the client 104 accounts for the remainder of a selected time period. For example, an expectation of future income in the form of dividend or interest inflows can be calculated and presented as estimated future income.

In various embodiments, one graphical display portion 506 of the tool 504 may be provided to display net withdrawals or income outflows associated with the client 104 accounts over a predetermined time period (e.g., year-to-date). Another graphical display portion 508 may be provided to display income inflows experienced by the client 104 accounts during the same time period. In the example shown, the graphical display portion 508 may be divided into a first segment 510 that illustrates actual income inflows into the selected accounts, and a second segment 512 that illustrates future estimated income associated with the accounts. In certain embodiments, the graphical display portion 508 may be further divided into one or more sub-segments that represent specific sub-periods within the selected overall time period. For example, the sub-segments may represent specific months of a predetermined year-long time period.

In various embodiments, the income analysis tool 504 may be configured to permit a user manipulation device to select a given segment or sub-segment to yield more detailed information associated with the selected segment or sub-segment. For example, by hovering over a given monthly sub-segment, transactions associated with the income inflows and outflows for that monthly sub-segment can be displayed. In certain embodiments, a transaction list 514 can be displayed that illustrates transactions for a given time period. In the example shown, transactions for the year period are displayed. These transactions may include "My Actions" transactions 516, such as deposits or withdrawals initiated by the client 104, and/or income 518 realized by account holdings, such as through interest or dividend inflows. In addition, an estimate 520 of future income for a given time period may be displayed in the transaction list 514. It can be seen that the income analysis tool 504 can be useful for enabling clients 104 who depend on significant income from their account holdings to manage and plan for present and future expenses. In addition, income inflows and outflows can be monitored closely over time by both clients 104 and their financial advisors to make appropriate adjustments to investment strategies, for example, and other financial decisions.

Figure 6:
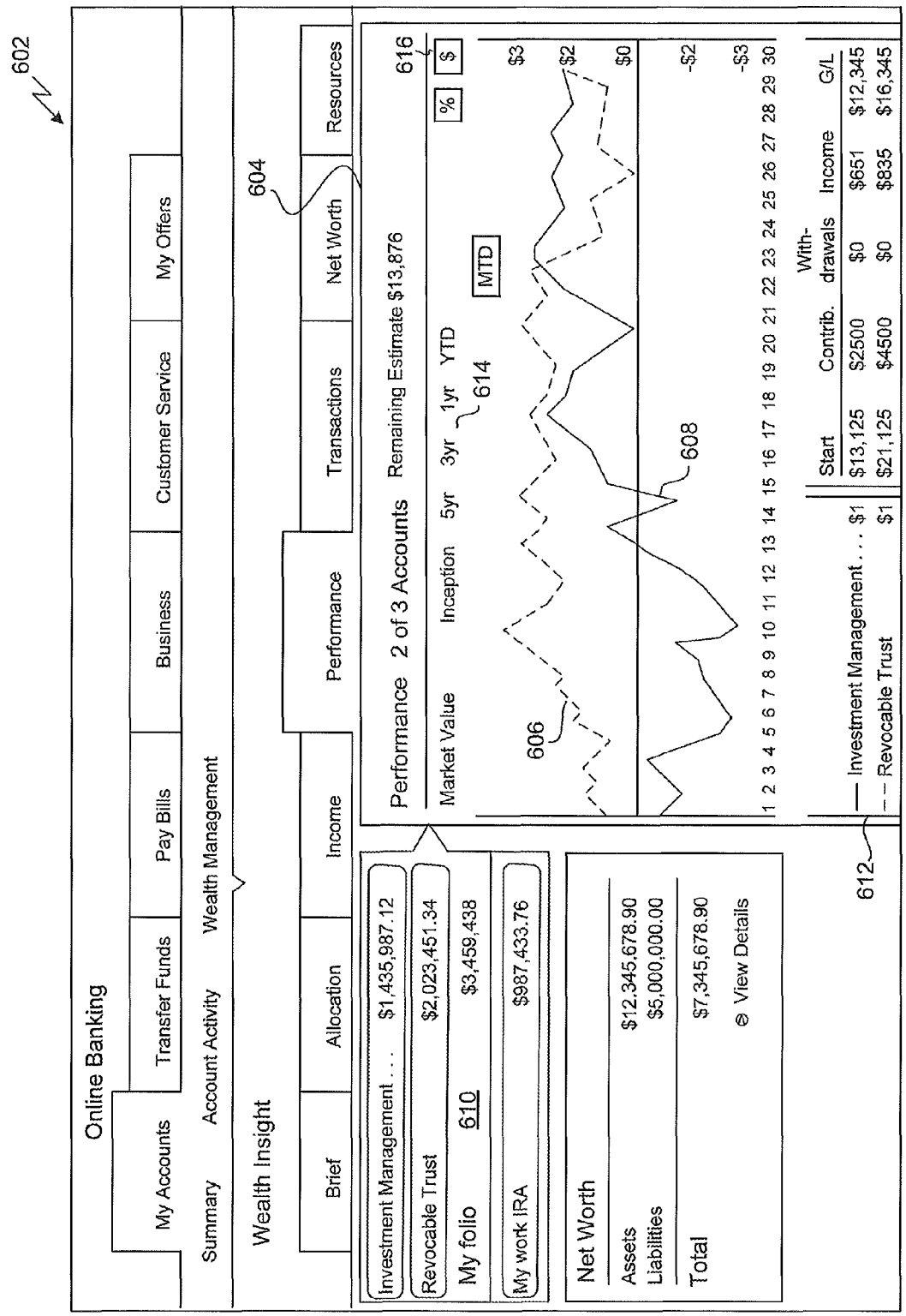
FIG. 6 includes an example of a screen display and associated analytical tools that may be configured in accordance with embodiments of the invention.

FIG. 6 includes a screen display 602 that illustrates aspects of an example of a performance analysis tool 604. In various embodiments, the performance analysis tool 604 provides a graphical illustration of the performance of the selected client 104 accounts over various selected time periods against one or more predetermined benchmarks or market indices (e.g., an S&P 500 index). In the example shown, a month-to-date comparison of client 104 account values 606 is presented along with a benchmark index of values 608 for the same time period. As described above, selecting a specific account or accounts in a "My PNC Folio" section 610 can isolate performance for only those accounts that have been selected. In various embodiments, an account performance section 612 can be provided that displays actual account performance figures, including starting values for the accounts, contributions made to the accounts, withdrawals made from the accounts, income realized by the accounts, and/or gains or losses experienced by the accounts. In certain embodiments, one or more different time periods 614 may be selected for the analysis (e.g., month-to-date, year-to-date, one-year performance, three-year performance, five-year performance, or another period). Also, dollar or percentage values 616 may be selected for the comparison displayed by the tool 604. For example, a percentage of performance of the selected client 104 accounts above or below the selected benchmark may be presented in a rate of return chart.

It can be appreciated that comparisons yielded by the performance analysis tool 604 can provide a relative measure of client 104 asset value against a predetermined benchmark. This may serve to stimulate discussions between the client 104 and a financial advisor regarding the expected or desired performance of assets in the client 104 accounts. For example, the client may be concerned that account performance does not suitably match current economic conditions as evidenced by potentially superior performance of a selected market index.

Figure 7:
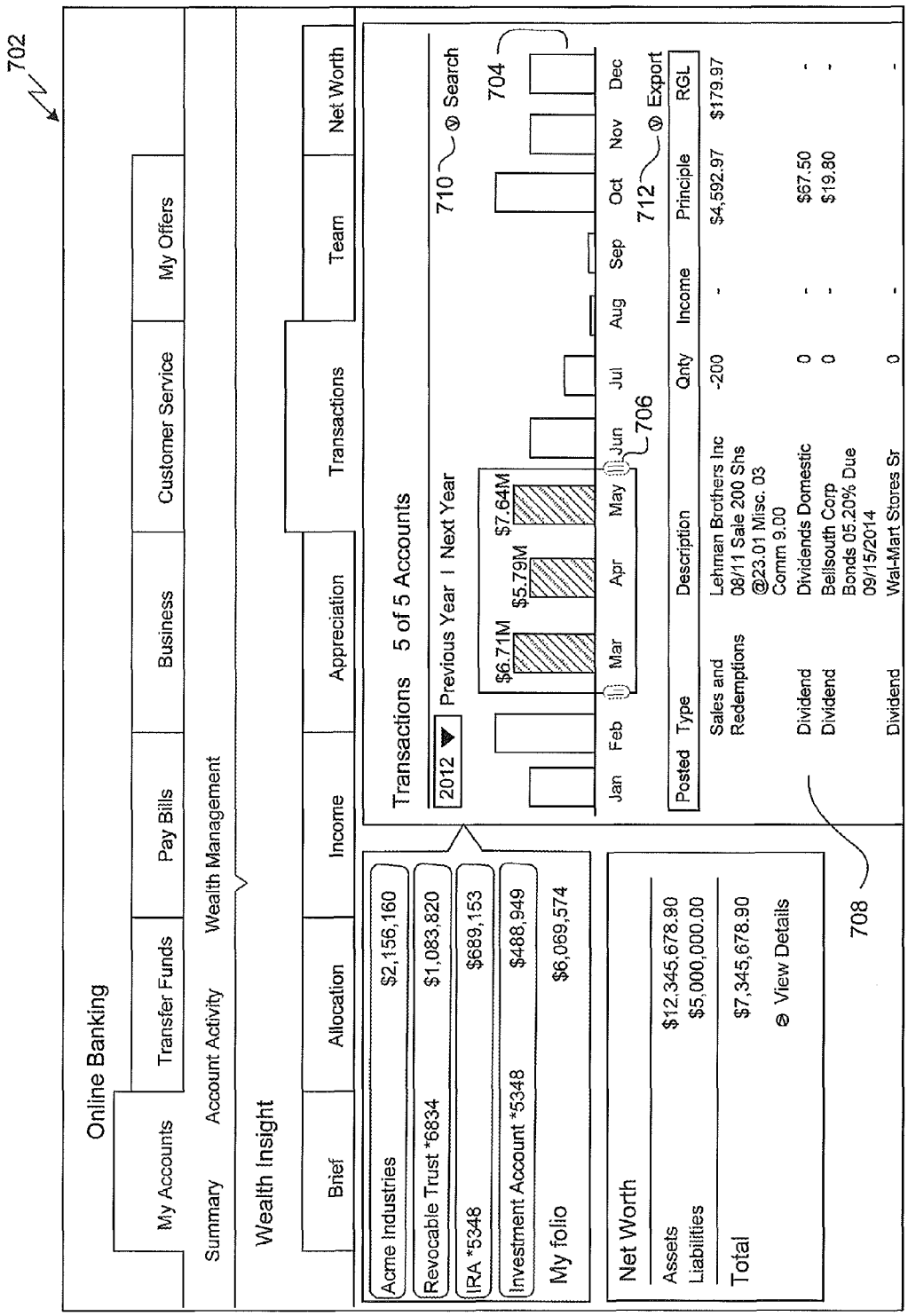
FIG. 7 includes an example of a screen display and associated analytical tools that may be configured in accordance with embodiments of the invention.

FIG. 7 includes a screen display 702 that illustrates aspects of an example of a transaction analysis tool 704. The transaction analysis tool 704 provides a visual representation of transaction activity occurring within selected client 104 accounts for a variety of predetermined time periods. In various embodiments, a selection slider 706 facilitates manipulation and filtering of sub-period transactions (e.g., monthly sub-period transactions occurring within a year time period). In the example shown, the selection slider 706 can be employed to select several months out of a year-long time period of account transactions. In various embodiments, consecutive months can be selected with the slider 706, as shown. In other embodiments, a reasonable combination of non-consecutive and consecutive periods can be selected for the analysis. In certain embodiments, a transaction list 708 including the selected time period of transactions can be presented on the screen display. The transaction analysis tool 704 facilitates visual interrogation of account value, and the transaction details displayed in the transaction list 708 can be synchronized with the visual display.

In various embodiments, a search tool 710 can be provided to enable searching and displaying transactions by various criteria, such as by date posted, description, quantity of shares, income, principal, and/or realized gain or loss, among others. In addition, an export link 712 may be provided for exporting transaction activity data to a desired spreadsheet program or financial planning software (e.g., "Quicken" software), for example.

Figure 8:
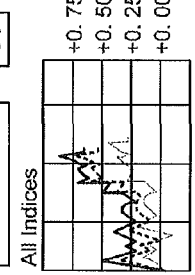
FIG. 8 includes an example of a screen display that may be configured for presentation in accordance with embodiments of the invention; and, FIG. 9 includes an example of a screen display and associated analytical tools that may be configured for presentation in accordance with embodiments of the invention.

FIG. 8 includes a screen display 802 that provides various financial information resources for clients 104 that may be accessed and employed in connection with one or more of the analysis tools described herein. In a "Market News" section 804, information regarding current market research, as well as market performance data, can be displayed. It can be appreciated that such information may be derived from a variety of sources for market news and data and can be provided as a research tool for investigating investment decisions or developing other financial strategies. In various embodiments, an "Investment Corner" section 806 can be provided with links to blogs or other commentary about investment strategy or current economic activity, for example. Information provided in the "Investment Corner" section 806 may be proprietary information provided exclusively to clients 104 that employ the wealth management system 101.

In various embodiments, an advisor team section 808 may be offered to allow users to designate a list of preferred wealth advisors. A team of advisors may be presented to the user from a pool of potential advisors to include in the team section 808. In a secure environment, clients 104 and advisors may exchange information about client 104 accounts, investment strategy, general economic conditions, or other information related to making financial decisions. In one aspect, the user may be permitted to arrange the team of advisors within the section 808 in an order or hierarchy that is preferred by the user. For example, the system 101 may be configured to alert the first advisor listed in the team section 808 if a decision regarding an account or transaction is required by the client 104.

In certain embodiments, selection by an advisor for the advisor team section 808 may be configured to facilitate communications between clients 104 and their designated advisors. For example, if a member of the advisor team section 808 publishes an article on investment strategy, then that article may be directly forwarded to the "Investment Corner" section 806 by virtue of selection of the author as a member of the client 104 team. In this manner, the user may be offered a degree of control regarding which content is displayed on the screen display 802. In another aspect, the client 104 has ready access to communicate (e.g., send an e-mail) questions or comments regarding financial decisions to their preferred advisors.

FIG. 9 includes a screen display 902 that illustrates an example of a Net Worth analysis tool 904. The Net Worth analysis tool 904 can be configured to assist a user with identifying assets and liabilities and to calculate a Net Worth value based on the identified assets and liabilities. In this manner, the Net Worth analysis tool 904 can be employed to generate a personalized balance sheet of assets and liabilities for clients 104. In various embodiments, the tool 904 may leverage aspects of the click-drag-drop functionality (as described above) to create groupings of assets and liabilities. In addition, groupings can be created by checking an option box or otherwise flagging a given account to indicate that the account should be included in the Net Worth calculation. The tool 904 offers the capability for a user to add, modify, or manipulate assets and liabilities, including items internal to the financial institution that controls the management system 101, as well as items external to the institution. Once one or more groupings 906, 908, 910 have been created and customized as desired by a user, asset and liability objects 912-928 representing asset and liability accounts can be readily moved into, out of, or between different groupings. Manipulation of the asset and liability objects 912-928 can be accomplished by use of the click-drag-drop functionality, for example, as described herein. In this manner, clients 104 can be provided with enhanced flexibility to group and dissect asset and liability groupings which reflect their mental models of their particular financial situations.

In various embodiments, assets or liabilities that are non-monetary may be created as accounts and included within or excluded from the groupings 906, 908, 910. Examples of non-monetary assets include art collections, automobiles, vacation homes, real estate, among many others. With this feature, the user can include whatever represents value to the user and can account for (or not account for) the asset within the Net Worth analysis. For example, a user may create an account for a favorite sport vehicle but not include the account in a grouping of assets, because the user does not desire the value of the sport vehicle to be accounted in the Net Worth calculation. Likewise, with regard to liabilities, an account can be created for a future liability, such as to fund a child's college education, and that account can be included in an appropriate grouping to become part of the Net Worth calculation. In certain embodiments, a graphical portion 930 of the Net Worth analysis tool 904 can display the total Net Worth of the client 104 as calculated based on the given groupings of assets and liabilities.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:
1. A computer-implemented analysis method comprising:
generating, with a computer processor, a graphical representation of income inflow and outflow activity occurring within a group of one or more asset objects selected in association with one or more client asset accounts for a predetermined time period;
generating, with the computer processor, a calculation of estimated future income for a future period associated with the predetermined time period;
displaying, with the computer processor, the estimated future income value expected for the client asset accounts for the future period of the predetermined time period; and
displaying, with the computer processor, a multi-segmented graphical display comprising:
a first segment having a dimension proportioned to visually illustrate actual income outflow value from the selected accounts for the predetermined time period;
a second segment having a dimension proportioned to visually illustrate actual income inflow value into the selected accounts for the predetermined time period; and a third segment having a dimension proportioned to visually illustrate estimated future income value for the selected accounts for the future period of the predetermined time period.

2. The method of claim 1, further comprising receiving a selection from a user to include an asset object in the selected group of asset objects.

3. The method of claim 2, wherein receiving the selection from the user includes a click-drag-drop manipulation for including the asset object.

4. The method of claim 1, further comprising receiving a selection from a user to exclude an asset object from the selected group of asset objects.

5. The method of claim 4, wherein receiving the selection from the user includes a click-drag-drop manipulation for excluding the asset object.

6. The method of claim 1, wherein at least one income inflow represents a change in an investment.

7. The method of claim 1, wherein at least one income outflow represents an account withdrawal.

8. The method of claim 1, wherein generating the calculation of estimated future income further comprises generating an expectation of future income in the form of a dividend inflow.

9. The method of claim 1, wherein generating the calculation of estimated future income further comprises generating an expectation of future income in the form of an interest inflow.

10. The method of claim 1, wherein displaying the first segment having a dimension proportioned to visually illustrate actual income outflow value further comprises displaying net withdrawals associated with the client accounts over the predetermined time period.

11. The method of claim 1, wherein displaying the multi-segmented graphical display further comprises aligning the first and second segments adjacent one another such that the segment visually illustrating the greater income value of the two segments extends beyond the other segment for a distance proportional to the difference between the actual income outflow value from the selected accounts and the actual income inflow value into the selected accounts.

12. The method of claim 1, further comprising displaying the multi-segmented graphical display, wherein each of the first, second and third segments is divided into one or more sub-segments that represent sub-periods of the predetermined time period.

13. The method of claim 12, further comprising receiving data representative of selection of a sub-period and displaying information associated with the selected sub-period.

14. A computer system for performing income analysis, the system comprising:
a communications device comprising a computer processor and an operatively associated non-transitory data storage media, wherein the data storage media comprises instructions that, when executed by the computer processor, cause the communications device to:
generate a graphical representation of income inflow and outflow activity occurring within a group of one or more asset objects selected in association with one or more client asset accounts for a predetermined time period;
generate a calculation of estimated future income for a future period associated with the predetermined time period;
display the estimated future income value expected for the client asset accounts for the future period of the given time period;
display a multi-segmented graphical display comprising:
a first segment having a dimension proportioned to visually illustrate actual income outflow value from the selected accounts for the predetermined time period;
a second segment having a dimension proportioned to visually illustrate actual income inflow value into the selected accounts for the predetermined time period; and
a third segment having a dimension proportioned to visually illustrate estimated future income value for the selected accounts for the future period of the predetermined time period.

15. The method of claim 11, wherein displaying the multi-segmented graphical display further comprises aligning the second and third segments end to end adjacent the first segment, wherein the second and third segments combine and extend for a distance proportional to the sum of the actual income inflow value into the selected accounts and the estimated future income value for the selected accounts for the future period.

16. The computer system of claim 14, wherein the first and second segments are aligned adjacent one another such that the segment visually illustrating the greater income value of the two segments extends beyond the other segment for a distance proportional to the difference between the actual income outflow value from the selected accounts and the actual income inflow value into the selected accounts.

17. The computer system of claim 16, wherein the second and third segments are aligned end to end adjacent the first segment, wherein the second and third segments combine and extend for a distance proportional to the sum of the actual income inflow value into the selected accounts and the estimated future income value for the selected accounts for the future period.

* * * * *